United States Patent Office 2,825,704
Patented Mar. 4, 1958

2,825,704

PREPARATION OF NORMALLY SOLID, HIGH MOLECULAR WEIGHT, HYDROCARBON POLYMERS WITH REDUCED PHOSPHOMOLYBDIC CATALYSTS

Herrick R. Arnold, Frank S. Fawcett, and Walter W. Gilbert, Wilmington, Del., assignors to E. I. du Pont de Nemours and Company, Wilmington, Del., a corporation of Delaware No Drawing. Application July 16, 1953
Serial No. 368,487

7 Claims. (Cl. 260—2)

This invention relates to new compositions of matter and to methods for their preparation. More particularly this invention relates to novel catalytic compositions and to their use as catalysts, particularly as catalysts for the hydrogenation of carbon monoxide to high molecular weight, normally solid, hydrocarbons.

Phosphomolybdic acids and their ammonium salts are commercially available products. It has been found that if these phosphomolybdic acids and ammonium phosphomolybdates are reduced under rigidly controlled conditions there are obtained novel compositions which possess unique catalytic properties, especially for the hydrogenation of carbon monoxide to high molecular weight, normally solid, hydrocarbons.

It is an object of this invention to provide novel reduced phosphomolybdic acids and reduced ammonium phosphomolybdates. Another object is to provide methods for preparing such reduced phosphomolybdic acids and reduced ammonium phosphomolybdates. A further object is to provide novel catalytic processes, especially for converting carbon monoxide to normally solid high molecular weight hydrocarbons. Other objects will appear hereinafter.

These objects are accomplished in accordance with the present invention by providing reduced phosphomolybdic compounds which are the products obtained by reducing in hydrogen at atmospheric pressure at a temperature of at least 350° C. for at least 5 hours a phosphomolybdic acid or ammonium phosphomolybdate, and by further providing a process for preparing normally solid, high molecular weight, hydrocarbon polymers which comprises heating and reacting carbon monoxide with hydrogen at a temperature of 125° to 350° C., under a pressure of at least 200 atmospheres and in contact with a phosphomolybdic compound represented by the formula $P_2Mo_{20-24}O_{31-60}$ which is a product obtainable as aforesaid.

The reduced phosphomolybdic compounds of the present invention are described and claimed in our copending continuation-in-part application Serial No. 529,575, filed August 19, 1955.

The reduced phosphomolybdic acids and reduced ammonium phosphomolybdates used in the process of this invention for preparing normally solid, high molecular weight, hydrocarbon polymers are the products obtained as follows: Phosphomolybdic acid or its ammonium salt is placed in a heat-resistant glass tube mounted within an electric furnace, and hydrogen alone, or hydrogen admixed with a diluent gas, such as nitrogen or carbon monoxide, is passed over the charge at atmospheric pressure at a rate corresponding to a space velocity which is desirably in excess of 500 reciprocal hours, while the temperature is raised from room temperature up to above 350° C. at the rate of 50° C. per hours. The reduction is continued under these conditions for at least 5 hours. Thereafter, the charge is permitted to cool to room temperature in a non-oxidizing atmosphere, flushed at room temperature with nitrogen, and stored under nitrogen, helium, or any other inert gas.

The composition of the reduced phosphomolybdic acid or its ammonium salt depends upon the temperature and time of reduction used. Within the temperature range of 400° and 475° C., which embraces the temperature conditions usually employed, and a 16 to 25 hour reduction period, the reduced products correspond to $$P_2Mo_{20-24}O_{38-60}$$

If temperatures above 500° C. are used, the phosphomolybdic acid or its ammonium salt undergoes further reduction to give a product corresponding to $P_2Mo_{20-24}O_{31-38}$. Thus the reduced phosphomolybdic compounds of this invention correspond to the formula $P_2Mo_{20-24}O_{31-60}$.

The phosphomolybdic acids used as starting materials are commercially available products and are phosphomolybdic acids containing phosphorus-molybdenum ratios varying from 1:10 to 1:12. Other phosphomolybdic acids containing phosphorus-molybdenum ratios outside this range, for example, phosphomolybdic acids in which the phosphorus-molybdenum ratios are as low as 1:2.5 give reduced products in accord with this invention. The ammonium salts of these acids are made by methods known to those skilled in the art. The preferred phosphomolybdic acids and their ammonium salts are generically hydrates of compounds comprehended by the formula: $H_x(NH_4)_yP_2Mo_{20-24}O_{68-80}$ wherein $x$ is 0 through 12 and $y$ is 0 through 10.

In accordance with the stated objects of this invention, a process is provided for preparing normally solid, high molecular weight, hydrocarbon polymers which comprises heating and reacting carbon monoxide with hydrogen at a temperature of 125° to 350° C. under a pressure of at least 200 atmospheres and in contact with a reduced phosphomolybdic compound which is the product obtained by reducing in hydrogen at atmospheric pressure at a temperature of at least 350° C. for at least 5 hours a phosphomolybdic acid or ammonium phosphomolybdate.

The examples which follow are submitted to illustrate and not to limit this invention.

EXAMPLE I

The phosphomolybdic acid employed in this example is a commercially available crystalline form reported to have the composition $P_2O_5 \cdot 20MoO_3 +$ aq. X-ray analysis shows this material to be highly crystalline, the diffraction pattern corresponding to that ascribed by ASTM standards to the composition $H_3PO_4 \cdot 10MoO_3 \cdot 24H_2O$. Spectrographic analysis shows exceptional purity. A typical analysis, for example, gives the following: Major-molybdenum; Minor-phosphorus; traces-Na(<0.1%), Si(<0.02%), Mg(<0.01%), Cu(<0.01%), Ag(<0.01%)

Elementary analysis, however, consistently shows the composition of the acid to be that of phospho-11-molybdic acid ($P_2O_5 \cdot 22MoO_3 \cdot 50-56H_2O$), instead of phospho-10-molybdic acid ($P_2O_5 \cdot 20MoO_3 \cdot XH_2O$).

One hundred seventy-five grams (ca. 160 cc.) of yellow crystalline phosphomolybdic acid is placed in a heat-resistant glass tube mounted in an electric furnace. Hydrogen at the rate of 160 liters per hour, equivalent to a space velocity of 1000 reciprocal hours, is passed through the tube at essentially atmospheric pressure. The system is then heated up from room temperature to 400° C. at the rate of about 75°-80° C./hr., and held under these conditions for 19 hours. During the heating-up period in the temperature range 100°-200° C., the water of crystallization is driven off, the phosphomolybdic acid undergoes a simultaneous color-change from yellow to light green. In the interval 200-350° C., no further water is formed and no significant change in appearance of the acid occurs. At approximately 375° C., reduction begins and is accompanied by evolution of water, and a gradual change in color of the acid from light green to deep blue, and finally to black. After reduction for 19 hours, the product is cooled to room temperature in hydrogen, flushed at room temperature with nitrogen, discharged, and sealed under nitrogen.

The black reduced product is highly pyrophoric and has a surface area of 157 m.$^2$/g. as determined by the method described in a paper by P. H. Emmett, entitled "A new method for measuring the surface area of finely divided materials and for determining the size of particles," Am. Soc. for Testing Materials, March 4, 1941, Symposium on New Methods for Particle Size Determination in the Sub-Sieve Range. The X-ray diffraction pattern of this black reduced product shows that it is essentially amorphous, and its empirical formula, as indicated by elementary analysis, is $P_2Mo_{22}O_{39}$ as compared with $H_6P_2Mo_{22}O_{71}$ for the unreduced material. This product is employed as a catalyst in the processes described in Examples A, I, K, M, and N.

EXAMPLE II

A sample of the phosphomolybdic acid described in Example I, above, is first dehydrated by heating to constant weight at 200° C. The anhydrous powder is then reduced in hydrogen for 18 hours at 400° C. under the conditions shown in Example I. The reduced product is black, pyrophoric, and substantially amorphous to X-rays. Elementary analysis shows the empirical formula to correspond essentially to $P_2Mo_{21}O_{47}$. The reduced material is used as a catalyst in Examples B, C, D, E, F, and L.

EXAMPLE III

A sample of anhydrous phosphmomlybdic acid powder, prepared as in Example II, above, is blended with 1% of graphite to serve as a lubricant, converted into pellets, and sized to 8 to 14 mesh granules suitable for use in continuous catalytic vapor phase processes. These granules are reduced under the conditions described in Example I, above. The reduced product is black, pyrophoric, and has a surface area of 121 m.$^2$/g. This product is used as a catalyst in the process described in Example J.

EXAMPLE IV

Anhydrous phosphomolybdic acid is reduced under the conditions described in Example I, using as the reducing gas a gaseous mixture of two volumes of $H_2$ and one volume of CO. The product is black and pyrophoric, and has an empirical formula, as determined by elementary analysis, corresponding to $P_2Mo_{23}O_{41}$. The product also contains approximately 2% carbon and 0.27% hydrogen. This material is used as a catalyst in the process described in Examples G and O.

EXAMPLE V

The table below is a summary of a series of runs illustrating the range of temperatures within which phosphomolybdic acid may be reduced and still yield products which are active hydrogenation catalysts. In this series of runs, samples of anhydrous phospho-11-molybdic acid, in powdered form, are reduced in hydrogen at a space velocity of 1000 reciprocal hours, at temperatures of 350° C., 400° C., 450° C. and 550° C., respectively, for the times indicated in the second column of the table below. The reduced products are black and pyrophoric and all are active catalysts.

| Temp. (° C.) | Time (hrs.) | Before Reduction | After Reduction | Area, m.$^2$ g. | Pyrophoric |
|---|---|---|---|---|---|
| 350 | 24 | $H_6P_2Mo_{22}O_{74}$ | $P_2Mo_{22}O_{54}$ | 2.1 | slightly. |
| 400 | 24 | $H_6P_2Mo_{22}O_{74}$ | $P_2Mo_{22}O_{40}$ | 210.0 | Yes. |
| 450 | 24 | $H_6P_2Mo_{22}O_{74}$ | $P_2Mo_{22}O_{39}$ | 197.0 | Yes. |
| 550 | 24 | $H_6P_2Mo_{22}O_{74}$ | $P_2Mo_{22}O_{32}$ | | Yes. |

EXAMPLE VI

Ammonium phosphomolybdate $(NH_4)_6 \cdot P_2Mo_{24}O_{80}$ is precipitated at pH 1 to 2 from a 10% solution of phosphomolybdic acid by the addition of 28% aqueous ammonia. The ammonium salt so prepared is reduced at atmospheric pressure and 400° C. in hydrogen at a space velocity of 1000 reciprocal hours for 24 hours. The reduced product corresponds in composition to $P_2Mo_{22}O_{48}$, is black, pyrophoric, amorphous to X-rays, and has a surface area of 233 m.$^2$/g. This product is used as a catalyst in Example H.

The reduced phosphomolybdic acids and reduced ammonium phosphomolybdates of this invention are versatile catalysts as illustrated in the examples which follow.

In the examples illustrating hydrogenation of carbon monoxide to high molecular weight, normally solid hydrocarbons, the hydrogen/carbon monoxide mixed gas ratio employed is 2:1, the reactor employed is of approximately 400 cc. capacity, and inherent viscosity refers to measurements made at 0.1% concentration in tetrahydronaphthalene at 125° C., unless otherwise stated.

EXAMPLE A

A mixture of 100 cc. of xylene and 10 g. of the reduced phosphomolybdic acid prepared as described in Example I is heated at 225° C. under 1000 atmospheres of hydrogen-carbon monoxide mixed gas. During 15 hours a gas absorption of 285 atmospheres occurs. The crude reaction product contains hard lumps of solid and, in addition, some fluffy white polymer. The mixture is filtered and the dried solid is extracted with benzene, yielding a trace of the solid material. Further extraction with boiling xylene, followed by dilution of the extract with methanol, yields 2.0 g. of fibrous white solid polymer having an inherent viscosity 2.76 and a melting point of 127–132° C. This polymer is manually spun to give fibers which can be cold drawn. It is compression-molded at 190° C. to give colorless transparent films which are flexible, stiff, and quite tough.

Example B

A mixture of 100 cc. of xylene and 10 g. of a reduced phosphomolybdic acid catalyst prepared as described in Example II is heated at 225° C. under a hydrogen-carbon monoxide mixed gas pressure of 1000 atmospheres. During a 15-hour period, the absorption amounts to 170 atmospheres. After extraction with benzene, to remove traces of soluble material, the solid is extracted with boiling xylene and on dilution of this extract with methanol a precipitate of 1.52 g. of white solid hydrocarbon polymer having an inherent viscosity of 2.85 is obtained. The polymer yields extremely tough molded objects and films.

Example C

A mixture of 50 cc. of xylene and 11 g. of a reduced phosphomolybdic acid catalyst prepared as described in Example II is heated in a pressure vessel, having a capacity of approximately 190 cc., for 3.5 hours at 200° C. under a pressure of 3000 atmospheres of hydrogen-carbon monoxide mixed gas. After extraction of the solid product with benzene, which removes a trace of material, extraction with refluxing xylene, followed by dilution of the xylene extract with methanol, yields 1.51 g. of a hydrocarbon polymer having an inherent viscosity of 2.46.

Example D

A mixture of 100 cc. of water and 13 g. of reduced phosphomolybdic acid catalyst, prepared as described in Example II, is heated at 275° C. under a hydrogen-carbon monoxide mixed gas pressure of 1000 atmospheres. Benzene extraction gives a trace of material and subsequent xylene extraction yields 2.70 g. of white solid polymer.

Example E

A mixture of 100 cc. of xylene, 10 g. of anhydrous ammonia and 11.6 g. of a reduced phosphomolybdic acid catalyst, prepared as described in Example II, is heated at 275° C. under a hydrogen-carbon monoxide mixed gas pressure of 1000 atmospheres. After 15 hours the gas absorption amounts to 565 atmospheres. Benzene extraction yields a trace of polymeric material and subsequent extraction with xylene, followed by precipitation with methanol, yields 1.91 g. of solid product.

Example F

A mixture of 100 cc. of n-propyl alcohol, 5 g. of anhydrous potassium carbonate and 21.3 g. of a reduced phosphomolybdic acid catalyst, prepared as described in Example II, is heated at 275° C. under 1000 atmospheres of hydrogen-carbon monoxide mixed gas. The crude reaction product is separated into a solid and a liquid portion by filtration. The solid is extracted with boiling benzene and on evaporation of the extract, 1.3 g. of a brown wax is obtained.

*Analysis.*—Calc'd for $(CH_2)_n$: C, 85.70; H, 14.30. Found: C, 83.22; H, 14.09.

Further extraction of the benzene-insoluble solid with boiling xylene, followed by dilution with methanol, yields 5.43 g. of white hydrocarbon polymer which shows an inherent viscosity of 1.04.

*Analysis.*—Found: C, 85.23; H, 14.66.

Distillation of the crude liquid fraction gives 24 g. of material boiling in the range of 69–82° C. and 5.8 g. of residue boiling higher than n-propyl alcohol.

Example G

A mixture of 100 cc. of xylene and 14.5 g. of reduced phosphomolybdic acid, prepared as described in Example IV, is heated at 275° C. under a hydrogen-carbon monoxide mixed gas pressure of 1000 atmospheres. During 15 hours a gas absorption of 1585 atmospheres is observed. The crude product is separated to give a solid portion and two liquid layers. After evaporation of the xylene solvent from the upper (less dense) liquid layer, there is obtained 1.3 g. of wax. Extraction of the crude solid product with refluxing benzene, followed by precipitation with methanol yields a trace of solid, and subsequent extraction with boiling xylene gives 1.72 g. of white hydrocarbon polymer.

Example H

A mixture of 100 cc. of xylene and 35 g. of reduced ammonium phosphomolybdate, prepared as described in Example VI, is heated at 275° C. under a hydrogen-carbon monoxide mixed gas pressure of 1000 atmospheres. During a period of 9.75 hours the gas absorption amounts to 810 atmospheres. After extraction with benzene to remove a trace of soluble material, extraction with boiling xylene yields 5.86 g. of solid polymer having an inherent viscosity of 1.60.

Analysis of the gas remaining in the apparatus at the end of the hydrogenation experiment shows the presence of appreciable quantities of carbon dioxide and paraffin hydrocarbons, principally methane, in addition to unreacted hydrogen and carbon monoxide.

Example I

A solution of 25 g. (0.2 mole) of nitrobenzene in 100 g. of benzene, in which is suspended 4.4 g. of reduced phosphomolybdic acid prepared as described in Example I, is shaken at 200° C. under a mixed gas pressure of 500 atmospheres for 1 hour in a 400 ml. pressure reactor. The mixed gas consists of 2 parts by volume of hydrogen to 1 part by volume of carbon monoxide. After separating the catalyst from the reaction mixture by filtration, the filtrate is distilled. Aniline is recovered in 40% conversion and 100% yield.

If nitrocyclohexane is used in place of nitrobenzene and hydrogen alone is used in place of the hydrogen-carbon monoxide mixed gas, and if the temperature, pressure and time of reaction are 100° C., 1000 atmospheres, and 18 hours, respectively, there is obtained cyclohexylamine in 50% conversion, along with a small amount of cyclohexylhydroxylamine.

Example J

Octanol-2 is vaporized at a constant rate of 0.29 mole/hr. and fed into a fixed bed reactor containing 25 ml. (39.0 g.) of 8–14 mesh reduced phosphomolybdic acid catalyst prepared as described in Example III. Simultaneously, nitrogen is passed into the reactor at a constant rate of 1.0 mole/hr. The catalyst bed is maintained at 330°±30° C., and the reaction is carried out at atmospheric pressure. The effluent gases from the reactor are condensed and consist of water, recovered octanol-2, and 0.35 mole (70% conversion) of octene $(C_8H_{16})$.

Propionitrile is obtained from propionamide in 56% conversion using the reduced phosphomolybidc acid of Example III, ammonia as a carrier gas and a temperature of 400°±38° C.

Example K

A 400 ml. steel reactor which has been flushed with a stream of nitrogen, is charged with 5.0 g. of reduced phosphomolybdic acid prepared as described in Example I, 100 g. of distilled water, and 84 g. (2 moles) of propylene. The tube is shaken and heated at 250° C. for 6 hours under autogenous pressure. The liquid product is filtered to remove the catalyst. The aqueous filtrate contains 23 g. of isopropyl alcohol (19% conversion).

Example L

A 400 ml. steel pressure reactor is flushed with nitrogen and charged with 5.0 g. of reduced phosphomolybdic acid prepared as described in Example II, and 112 g. (2 moles) of isobutylene. After the reactor is shaken and heated for 6 hours at 200° C. under autogenous pressure, 15.5% of the isobutylene is converted to a mixture of diisobutylene and triisobutylene containing a minor proportion of higher polyisobutylenes.

Example M

A 300 ml. round-bottom 4-necked flask equipped with a mechanical stirrer, a reflux condenser, a thermometer, and a nitrogen inlet tube to provide an inert atmosphere, is charged with 136 g. (1 mole) of freshly distilled alpha-pinene and 10.9 g. of reduced phosphomolybdic acid, prepared as described in Example I. The stirred reaction mixture is brought to the reflux temperature and maintained at gentle reflux (155° C.) for 1 hour. At the end of this time the catalyst is removed by filtration, and the camphene content of the filtrate is determined by infrared-spectral analysis. The camphene in the filtrate amounts to a 30% conversion of the starting alpha-pinene.

Example N

A 400 ml. pressure reactor is charged with 47 g. (0.5 mole) of phenol, 112 g. (2 moles) of isobutylene, and 5.0 g. of reduced phosphomolybdic acid prepared as described in Example I. The mixture is shaken and heated to 250° C. for 8 hours under autogenous pressure. There is recovered 135 g. of liquid products, after filtering the reaction mixture to separate the catalyst. An ether solution of the mixture is extracted repeatedly with 5% sodium hydroxide solution. The combined sodium hydroxide extracts are treated with carbon dioxide gas to precipitate 39 g. of phenols, of which 18 g. is p-tert.-butyl phenol (24% conversion). The alkali-extracted ether solution is concentrated and distilled to give 37 g. of diisobutylene (34% conversion), and small amounts of higher polyisobutylenes and neutral aromatic products.

Example O

A silver-lined pressure reactor is charged with 82 g. (1 mole) of cyclohexene and 7.0 g. of $H_2$/CO reduced phosphomolybdic acid prepared as described in Example IV. The reactor is shaken and heated to 200° C. for 10 hours under a mixed gas pressure of 900–1000 atmospheres. The mixed gas consists of 2 parts by volume of hydrogen to 1 part by volume of carbon monoxide. The liquid products recovered from the reactor are distilled to separate unreacted cyclohexene from the higher boiling hexahydrobenzaldehyde. Hexahydrobenzaldehyde is recovered in 3.3% conversion and nearly quantitative yield based on cyclohexene.

It is to be understood that the examples have been submitted to illustrate certain preferred embodiments and that they are not to be construed as limiting this invention.

The hydrogenation of the carbon monoxide can be operated as a batch, as a semi-continuous, or as a continuous up-flow, down-flow, or counter-current operation. It can also be carried out as a co-current flow or boiling bed operation.

The mole ratio of hydrogen to carbon monoxide in the gas mixture may vary from 5:1 to 1:10. Usually, mole ratios of from 3:1 to 1:2 are used because gas mixtures in this range of composition are ordinarily available in large scale and give optimum results from the standpoint of yield of desired high molecular weight hydrocarbons.

The temperature at which the hydrogenation of the carbon monoxide is effected lies in the range of 125° to 350° C. Because good reaction rates, with best yields of desired high molecular weight hydrocarbons are obtained in the range 150° to 275° C., this range embraces the preferred operating temperature conditions.

The process is usually operated under a total pressure of at least 200 atmospheres. Because better yields of desired high molecular weight hydrocarbons, with maximum utilization of the carbon monoxide and hydrogen, are achieved using pressures in excess of 400 atmospheres, the use of such pressures is economical and embraces a preferred mode of operation. The maximum pressure which is utilizable is dictated simply by the mechanical limitations of the equipment used. For practical reasons, pressures above 5000 atmospheres are generally not used and this therefore constitutes a practical upper pressure limit.

Because the reaction is highly exothermic, it is preferred to operate in the presence of a liquid reaction medium, which besides aiding in the dissipation of the heat of reaction also functions to bring about better catalyst contact, and hence improves the efficiency of the process. Suitable media are water and such organic compounds as cyclohexane, methanol, decahydronaphthalene, tetrahydronaphthalene, benzene, toluene, xylene, cyclohexanone, methyl isobutyl ketone, etc. The reaction medium can occupy up to 60% or as little as 5% of the reactor volume. Generally, however, in batch operation the reaction medium occupies between 25 and 50% of the reactor volume.

The time of reaction depends upon such interdependent variables as temperature, pressure, and amount and type of catalyst employed. Under preferred conditions for batch operation the reaction reaches essential completion in from 5 to 20 hours.

The amount of catalyst used depends upon such interdependent variables as temperature, pressure, general method of operation, catalyst activity, etc. As a rule in batch operation it will be between 1.5 and 30% and preferably between 2.5 and 20% by weight (of the reaction medium in a carbon monoxide hydrogenation) of the material undergoing reaction. In continuous operation, the weight of product in the reactor at any one time is ordinarily less than the weight of the catalyst, but the total weight of material processed during the active life of the catalyst is usually at least ten times the catalyst weight.

The surface of the reactor in contact with the reactants appears to be a factor in determining the molecular weight and yield of high molecular weight hydrocarbons obtained from carbon monoxide. Silver and stainless steel are satisfactory materials.

The process of this invention makes it possible to convert carbon monoxide to normally solid, high molecular weight hydrocarbons, having properties which make them outstandingly useful for conversion to films and fibers. In the table below are summarized the physical properties of these products determined on composite samples synthesized at 225° C. and 275° C. using reduced phosphomolybdic acid catalysts ("TS" refers to tensile strength in p. s. i., and "elong." refers to elongation at break in percent).

| Synthesis Temperature | 225° C. | 275° C. |
|---|---|---|
| Inherent viscosity | 2.8 | 1.6 |
| Density | 0.97 | 0.95–0.96 |
| 20-mil Film, TS/elong. (p. s. i./percent) | 3,500/622 | 3,750/50 |
| 5-mil Film, TS/elong. (p. s. i./percent) | 3,775/180 | 3,900/33 |
| Stiffness, p. s. i. | 122,000 | 130,000 |

As many apparently widely different embodiments may be made without departing from the spirit and scope of this invention, it is to be understood that this invention is not limited to the specific embodiments thereof, except as defined in the appended claims.

We claim:

1. A process for preparing normally solid, high molecular weight, hydrocarbon polymers which comprises heating and reacting carbon monoxide with hydrogen at a temperature of 125° to 350° C. under a pressure of at least 200 atmospheres and in contact with a phosphomolybdic compound represented by the formula $$P_2Mo_{20-24}O_{31-60}$$

2. A process for preparing normally solid, high molecular weight, hydrocarbon polymers which comprises heating and reacting carbon monoxide with hydrogen at a temperature of 125° to 350° C. under a pressure of at least 200 atmospheres and in contact with a phosphomolybdic compound represented by the formula $$P_2Mo_{20-24}O_{38-60}$$

3. A process for preparing normally solid, high molecular weight, hydrocarbon polymers which comprises heating and reacting carbon monoxide with hydrogen at a temperature of 150° to 275° C. under a pressure within the range of 400 to 5000 atmospheres and in contact with a phosphomolybdic compound represented by the formula $P_2Mo_{20-24}O_{38-60}$.

4. A process for preparing normally solid, high molecular weight, hydrocarbon polymers which comprises heating and reacting carbon monoxide with hydrogen at a temperature of 150° to 275° C. under a pressure within the range of 400 to 5000 atmospheres and in contact with a phosphomolybdic compound represented by the formula $P_2Mo_{22}O_{39}$.

5. A process for preparing normally solid, high molecular weight, hydrocarbon polymers which comprises heating and reacting carbon monoxide with hydrogen at a temperature of 150° to 275° C. under a pressure within the range of 400 to 5000 atmospheres and in contact with a phosphomolybdic compound represented by the formula $P_2Mo_{21}O_{47}$.

6. A process for preparing normally solid, high molecular weight, hydrocarbon polymers which comprises heating and reacting carbon monoxide with hydrogen at a temperature of 150° to 275° C. under a pressure within the range of 400 to 5000 atmospheres and in contact with a phosphomolybdic compound represented by the formula $P_2Mo_{22}O_{48}$.

7. In a process for preparing normally solid, high molecular weight, hydrocarbon polymers by heating and reacting carbon monoxide with hydrogen under pressure in contact with a catalyst, the improvement which comprises heating and reacting the carbon monoxide with hydrogen at a temperature of 150 to 275° C. under a pressure of at least 200 atmospheres and in contact with a phosphomolybdic catalyst of the formula $P_2Mo_{20-24}O_{31-60}$.

References Cited in the file of this patent

UNITED STATES PATENTS

| | | |
|---|---|---|
| 2,503,991 | Bechtold | Apr. 11, 1950 |
| 2,632,014 | Gresham | Mar. 17, 1953 |
| 2,652,372 | Farlow | Sept. 15, 1953 |
| 2,714,583 | Fawcett | Aug. 2, 1955 |
| 2,726,218 | Arnold | Dec. 6, 1955 |

OTHER REFERENCES

Hoffmann: "Lexikon der Anorganischen Verbindungen"; published by Johann Ambrosius Barth, Leipzig, Germany; 1914, vol. 2, page 708.

Mellor: "Comprehensive Treatise on Inorganic and Theoretical Chemistry"; published by Longmans, Green and Co., New York; 1931, vol. 11, page 660.

UNITED STATES PATENT OFFICE
CERTIFICATE OF CORRECTION

March 4, 1958

Patent No. 2,825,704

Herrick R. Arnold et al.

It is hereby certified that error appears in the printed specification of the above numbered patent requiring correction and that the said Letters Patent should read as corrected below.

Column 1, line 67, for "50° C. per hours" read -- 50° to 85° C. per hour --; column 3, lines 69 and 70, in the heading to the table, fifth column thereof, for "Area," read -- Area, --.
$m.^2g.$    $m.^2/g.$ Signed and sealed this 5th day of August 1958.

(SEAL)
Attest:

KARL H. AXLINE
Attesting Officer

ROBERT C. WATSON
Commissioner of Patents